United States Patent [19]
Lo et al.

[11] Patent Number: 5,459,714
[45] Date of Patent: Oct. 17, 1995

[54] ENHANCED PORT ACTIVITY MONITOR FOR AN INTEGRATED MULTIPORT REPEATER

[75] Inventors: William Lo, Santa Clara; Nader Vijeh, Sunnyvale, both of Calif.

[73] Assignee: Advanced Micro Devices, Inc., Sunnyvale, Calif.

[21] Appl. No.: 21,008

[22] Filed: Feb. 22, 1993

[51] Int. Cl.⁶ .................................................. H04B 3/46
[52] U.S. Cl. ........................... 370/13.1; 370/17; 375/250; 379/4; 371/20.2
[58] Field of Search ................. 370/13, 13.1, 15, 370/17; 371/20.1, 20.2, 20.4, 20.5; 375/3.1; 379/4

[56] References Cited

U.S. PATENT DOCUMENTS 5,251,203 10/1993 Thompson ........................ 370/13.1
5,293,375 3/1994 Moorwood et al. ............... 370/13.1
5,339,307 8/1994 Curtis ................................ 370/13.1

Primary Examiner—Wellington Chin
Attorney, Agent, or Firm—Joseph A. Sawyer, Jr.; Judy M. Maher

[57] ABSTRACT

A system is provided on an Integrated Multiport Repeater (IMR) to monitor the activity of the IMR when the repeater is in minimum mode. Through this system the serial output pin outputs status based upon inputs at two input pin the signal in and the clock signal. In a preferred embodiment there are four different status outputs, partition, loopback/link, Bitrate and SQE/Polarity. This system finds use in low end applications where complex control circuitry is not desired.

12 Claims, 5 Drawing Sheets

CS LATCH

LOOPBACK/SQE LATCH

BITRATE LATCH

ENHANCED PORT ACTIVITY MONITOR
FOR AN INTEGRATED MULTIPORT
REPEATER

FIELD OF THE INVENTION

The present invention relates generally to monitoring the port activity of an Integrated Multiport Repeater and more particularly, to the monitoring of such activity when the repeater is in minimum mode.

BACKGROUNDS OF THE INVENTION

FIG. 1 is a block diagram of a conventional Local Area Network (LAN) 10 of a type proliferating in the computing market. These LANs permit a Data Terminal Equipment (DTE) 12, a computer or business machine, which provides data in a digital form, to transfer data and control information with other DTEs 12: Communication from a first DTE 12 to a second DTE 12 is implemented by use of Data Communications Equipment (DCE) 14 which provide functions required to establish, maintain and terminate a connection. DCE 14 provides whatever signal conversion or processing that is necessary or desirable.

There are two interfaces which are important to understand. These include a DTE/DCE interface 16 and a DCE/DCE interface 18, commonly referred to a transmission channel, or medium. For proper and reliable communication, a set of rules for communication between like processes, which provide a means of controlling information transfer between stations (DTEs) on a datalink, known as a protocol are implemented.

A popular protocol referred to as Carrier Sensing, Multiple Access, Collision Detection (CSMA/CD) has been commercially successful. This protocol permits multiple stations to access a LAN system. Each station, before transmitting, will sense a carrier signal indicating that the network presently is being used to transmit a message. If it senses the carrier signal, transmission will not be initiated.

It is possible, due to time delays in propagating a signal from a DTE 12 that two transmissions will overlap. This overlap is referred to as a collision, which will be detected by DCEs 14 on the network. Upon detecting a collision, all transmissions will be terminated and DTEs 12 desiring to transmit will wait a random period of time before attempting to transmit again. This protocol is further defined in IEEE Standard 802.3, hereby expressly incorporated by reference for all purposes, which sets forth requirements for the DTE/DCE interface 16, referenced as an Attachment Unit Interface (AUI). The IEEE Standard 802.3 defines a system which is similar to Ethernet, a registered trademark of Xerox Corporation.

Repeaters are utilized in a LAN network to amplify or regenerate signals passed in the network to compensate for losses. Repeaters will also re-synchronize signals as necessary. Integrated Multiport Repeaters (IMR's) have multiple ports therewithin to receive and transmit multiple data signals.

The IMR includes a carrier sense (CRS) pin which outputs the carrier status of each port. In a preferred embodiment, there are nine (9) ports on the IMR. Typically, the output sequence is the 10 bit serial data stream: LA 01234567, where L=low, A=attachment unit interface (AUI), 0–7=twisted pair port (TP) 0–7.

In normal mode of operation, the serial output pin (SO), serial input pin (SI) and serial clock pin (SCLK) provide management functions for the repeater.

The management function consists of status and controls that are important in complex, high end repeater applications utilized within a LAN network. However, in low end applications, not all the management functionality is necessary. It is important to be able to use an IMR in applications where the complex logic circuitry for providing repeater management status is not needed and still allow the IMR to operate within the IEEE standard set forth for LAN network. It is also important that the IMR be compatible with these standards and still operate efficiently within the context of the particular application. Finally it is important that the IMR be capable of providing support for twisted pair link loopback status, port partitioning status and polarity status signal quality error (SQE). The present invention provides a system that addresses the above-mentioned need.

SUMMARY OF THE INVENTION

A system is provided for monitoring the activity of various ports on a Repeater that has multiple ports such as IMR. When the repeater is in the minimum mode a circular shift register receives the data stream, one of the bits of the data stream generates a pulse which indicates which port should provide status bits to the output. The system includes means coupled to the register for scanning the status out on the serial output (SO) pin when the pulse is generated.

In one aspect, the SO pin will output four (4) status conditions, link/loopback, Bitrate, partition or SQE/Polarity. Accordingly, through the use of this system status conditions can be provided with the addition of minimal control logic.

DETAILED DESCRIPTION OF THE INVENTION

The present invention is directed to monitoring the activity of ports in an Integrated Multiport Repeater. The following description is presented to enable one of ordinary skill in the art to make and use the invention and is provided in the context of a patent application and its requirements. Various modifications to the preferred embodiment will be readily apparent to those skilled in the art. Accordingly, the present invention should only be limited by the generic principles and features described herein.

Figure 1:
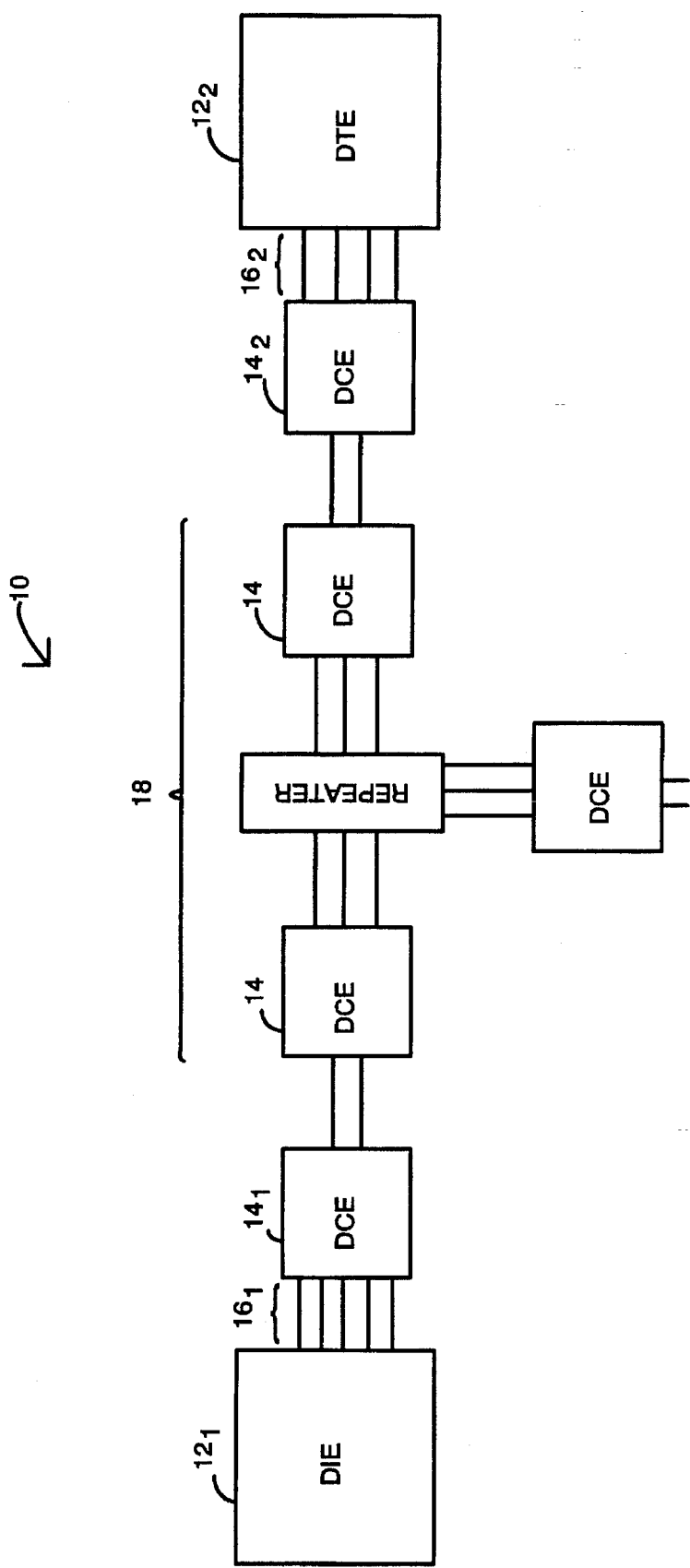
FIG. 1 is a block diagram of a prior art Local Area Network (LAN).
Figure 2:
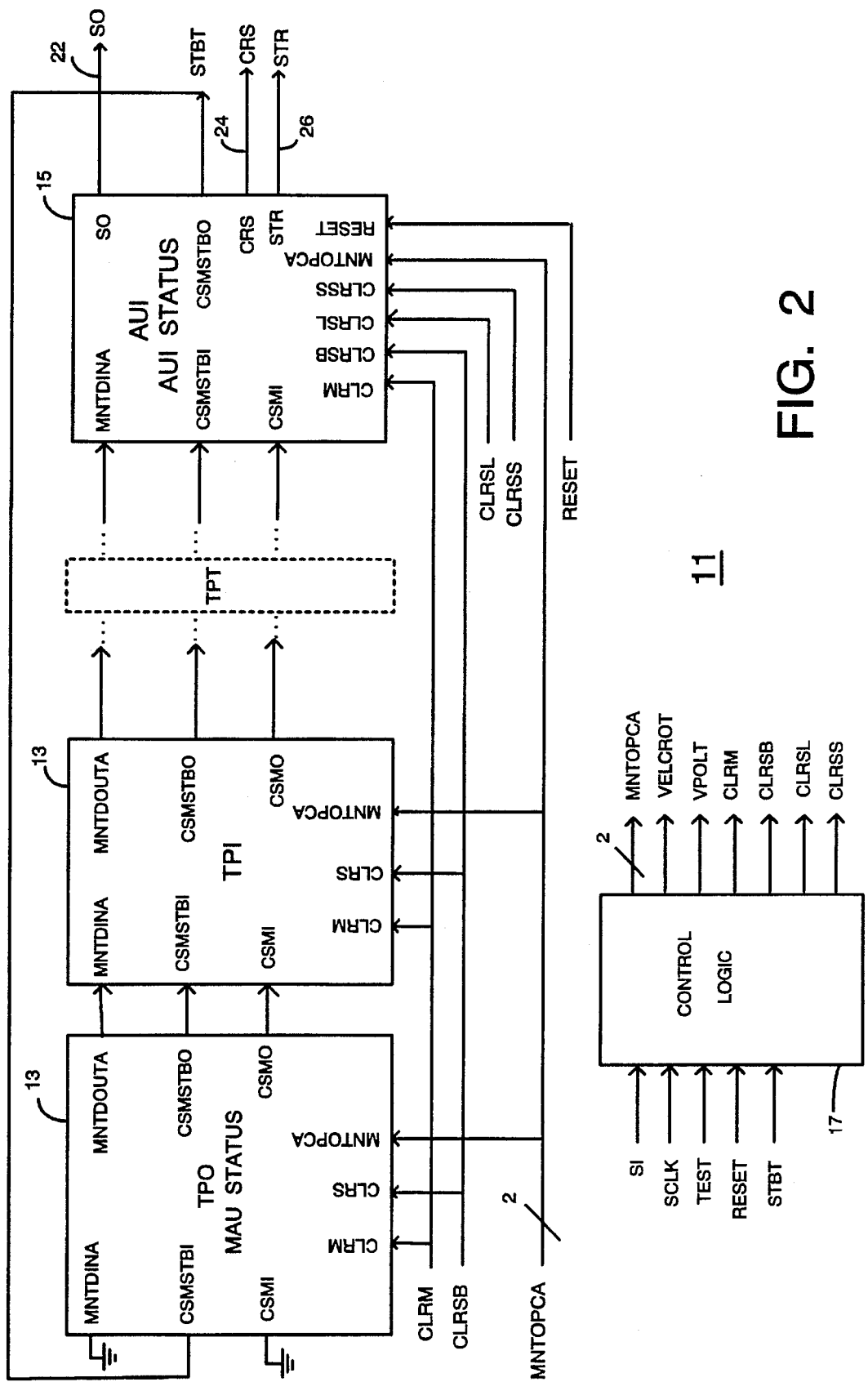
FIG. 2 is a simplified block diagram of the enhanced port activity monitor in accordance with the present invention.

Referring now to FIG. 2, what is shown in simplified block diagram form is an enhanced port activity monitor 11 that is utilized to monitor the status of an IMR in accordance with the present invention. The monitor 11, in a preferred embodiment, is utilized to monitor nine (9) ports of an IMR. It should be understood that the IMR could have any number of ports and that use would be within the spirit and scope of the present invention. Hence, in the embodiment of the monitor 11 shown, there are 8 medium attachment unit (MAU) circuits 13, one attachment unit interface (AUI) circuit 15, and one control circuit 17.

As is seen in FIG. 2, the MAU circuits 13 am connected in series such that the MNTDOUTA is coupled to the MTNTDINA input of the following MAU circuit 13, the CSMSTBO is coupled to the CSMSTBI input of the following MAU circuit 13 and the CSMO output of a first MAU circuit 13 is coupled to the CSMI input of the following MAU circuit 13. The MNTDINA signal propagates the management status for a particular port. The MNTDOUTA signal is the status of the port. The CSMSTBI, CSMSTBO signals are the strobe rings. The CSMO signal function similarly to the MNTDOUTA. The CMSI signal propagates carrier sense status. The last MAU circuit 13 in the chain is coupled to the AUI circuit 15. The MNTDOUTA output of the last MAU circuit is coupled to the MNTDINA input of the AUI circuit 15, the CSMSTBO output is coupled to the CSMSTBI input of the AUI circuit 15 and the CSMO output is coupled to the CSMI input of the AUI. The outputs of the AUI circuit 15 includes STBT signal 30 which is fed back to the CSMSTBI input of the first MAU circuit 13. The AUI circuit 15 provides a serial out signal (SO) output 22, a carrier sense signal (CRS) output 24 and a strobe (STR) signal output 26. Control signals from control circuit 17 provide for the propagation of a packet of data through the monitor system.

Functionality

The IMR port outputs the carrier sense status of all 9 ports serially on the CRS pin. The output sequence is a 10 bit serial stream: . . . LA01234567 . . . where L=low, A=AUI, 0–7=TP 0–7. The signal is framed by the high pulse on the STR pin by the following relationship:

CRS . . . LA01234567

STR . . . HLLLLLLLL . . . where L=low, H=high.

When the IMR is set to the minimum mode the SO pin functions in a similar way to the CRS pin except instead of sending carrier sense status, one of the following four status is output based on the inputs at the SI and SCLK pins: Partition, Loopback/Link, Bitrate, or SQE/Polarity. The bit position of the SO pin is the same as for CRS. To more fully understand the present invention, refer now to the following discussion.

Entering the Minimum Mode

The IMR can be programmed to be in the minimum mode based on the input at the TEST pin of control circuit 17 during the de-assertion of a reset pulse. Similarly the reverse polarity function can be enabled or disabled based on the input at signal input pin at the de-assertion of RESET (only if the part is programmed to be in minimum mode). The control circuit 17 latches the values of TEST and SI on the de-assertion of RESET and indicates whether the IMR is in the minimum mode by asserting a VELCROT signal pin, and if in the minimum mode, whether the reverse polarity function is to be enabled by asserting VPOLT.

In this embodiment, VELCROT is assumed to be asserted and the monitor 11 is assumed to be in the minimum mode. Therefore this signal will not be shown in the diagrams in order to simplify the discussion. Similarly VPOLT only controls the reverse polarity circuit and will not be shown.

Figure 3:
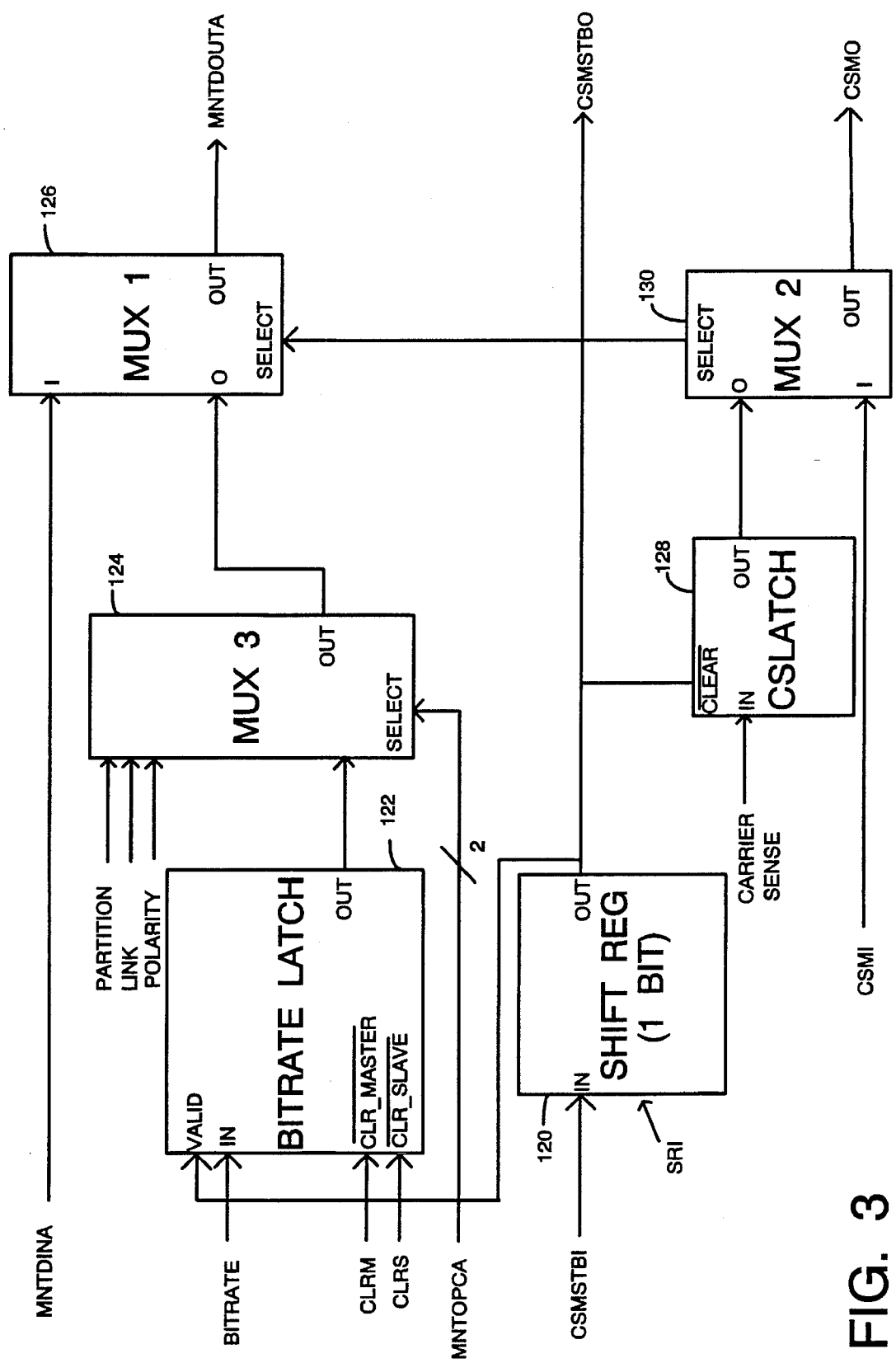
FIG. 3 is a block diagram of a portion of the enhanced port activity monitor circuit associated with a medium attachment unit (MAU).
Figure 4:
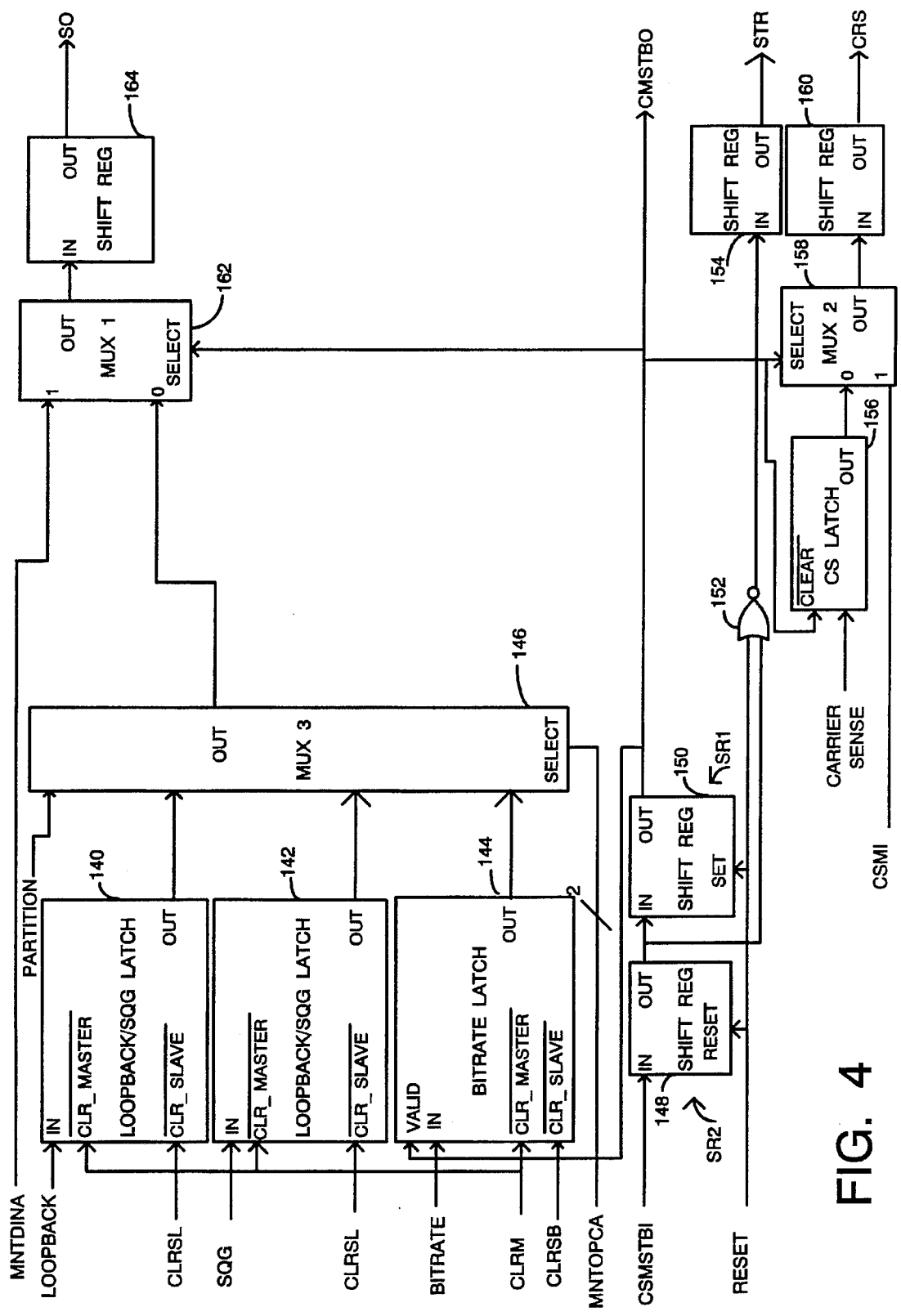
FIG. 4 is a block diagram of a portion of the enhanced port activity monitor circuit associated with an attachment unit interface (AUI).

Before there is any further discussion of the operation of the monitor 11 of FIG. 2 refer now to FIGS. 3 and 4 which are detailed block diagrams of the MAU circuit 13 and the AUI circuit 15 of FIG. 2.

Referring now to FIG. 3, in MAU circuit 13 a shift register 120 which receives the CSMSTBI signal is coupled to a valid input of the bitrate latch 122. The register 120 provides the CSMSTBO output that Bitrate latch 122 receives. Bitrate latch 122 also receives a input a clear master and clear slave signals and provides an output signal to multiplexer 124. Multiplexer 124 also receives partition, link and polarity signal inputs and provides an output to a second multiplexer 126 at input (0). The (1) input of multiplexer 126 is coupled to MNTDINA signal. The multiplexer 126 provides the MNTDOUTA output signal. The select input of multiplexer 126 is coupled to the output of register 120.

Carrier sense (CS) latch 128 receives a carrier sense signal on its input. The CLEAR input of the latch 128 is coupled to the output of register 120. The output of register 128 is coupled to the (0) input of a third multiplexer 130. The (1) input of multiplexer 130 is coupled to the CSMI signal. The output of multiplexer 130 provides the CSMO output signal.

Referring now to FIG. 4, AUI circuit 15 comprises three latches 140, 142, and 144 which receive certain status conditions as well as clock signals. Each of these registers in turn are coupled to multiplexer 146. Multiplexer 146 also receives a 2 bit select signal MNTOPCA and a partition signal.

Shift registers 148 and 150 are serially coupled to each other and are also coupled to a common reset line. The output of register 150 is coupled to the valid input on the shift register 144. The output of shift register 150 also provides the CMSTBO output signal.

The output from the register 148 is coupled to one input of NOR gate 152. The other input of NOR gate 152 is coupled to the RESET signal. The output of NOR gate 152 is provided to shift register 154 which in turn provides the strobe (STR) signal. A carrier sense status signal is provided to a carrier sense (CS) latch 156. The output register 150 is provided to a clear input of the CS latch 156. The output of the CS latch 156 is provided to one input (0) of multiplexer 158. The select input of multiplexer 158 is coupled to the output of register 150. The output of multiplexer 158 is coupled to the input of shift register 160 which provides the CRS signal. The output of register 150 is also coupled to select register of multiplexer 162. Multiplexer 162 also receives MNTDINA on one input (1) and the output of multiplexer 146 on a second input (0). The output of multiplexer 162 is coupled to shift register 164. The shift register 164 provides the serial output (SO) signal.

Strobe Ring

Registers 120 in the MAU circuit 13 and 148, 150 in the AUI circuits 15 are connected to form a 10 bit circular shift register. Upon reset in AUI circuit 15 register 148 is set low and register 150 is set high. The high value will propagate to the register 120 in MAU circuit 13 if RESET is asserted for at least 9 bit times. Once RESET is de-asserted the low bit will circulate through the circular shift register, completing 1 cycle per 10 bit times.

This circulating low bit is used to generate the STR pulse and indicates which port should output its status on CRS and SO pins.

Output Bit Stream

AUI circuit 15 and MAU circuit 13 includes multiplexers 126 and 162 respectively and multiplexer 130 and 158 respectively. All the multiplexers 126 and 162 are coupled such that they either pass the status from the port it services (input 0) or the status sent from the previous port (input 1). (MNTDOUTA from the previous port connects to MNTDINA of the next port). Note that the status sent from the previous port could actually be from the port that is before that one and so on. (i.e. status from TP0 will propagate through all 8 instances of MAU circuit 13 and AUI circuit 15 before being output on the SO pin.)

The circulating low bit in the strobe ring determines which port's status bits are output at any given time. Note that since there is only one low bit in the strobe ring, at most 1 port is selected at any given time. When none of the ports are selected (9 ports, 10 bit time) a low is output to SO since MNTDINA of TP0 MAU status is connected low. This low on SO coincides with STR being high.

The multiplexers 130 and 158 are connected in the same way except they service the CRS pin. (CSMI connects to CSMO.)

Input Sampling

The SI and SCLK input pins are sampled once per 10 bit times by the control circuit 17 (FIG. 2). The sampling time occurs 0.5 bit time after the falling edge of STBT. (The sampling time coincides approximately with the falling edge of STR.) The sampled value is translated to the appropriate values on MNTOPCA which selects the correct status bit to output on the multiplexer 146 and 124 in AUI circuit 15 and MAU circuit 13, respectively.

Bit Clearing

The partition, link and polarity status are real time status in that whatever the value of the status is during the time it is scanned out is placed on SO. The bitrate, loopback error, sqe error, and carrier sense status are sticky status in that once these events occur, the fact that the events occurred are stored until they are scanned out.

Figure 5:
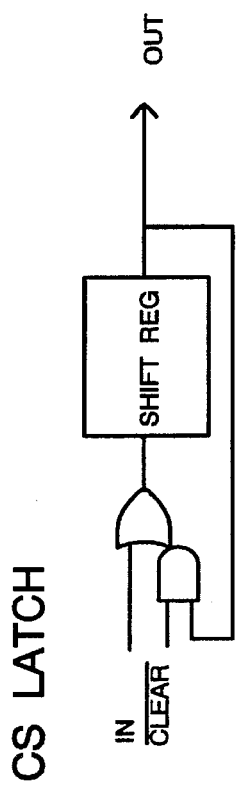
FIGS. 5–7 are various latches utilized within the enhanced port activity monitor of FIG. 2.
Figure 7:
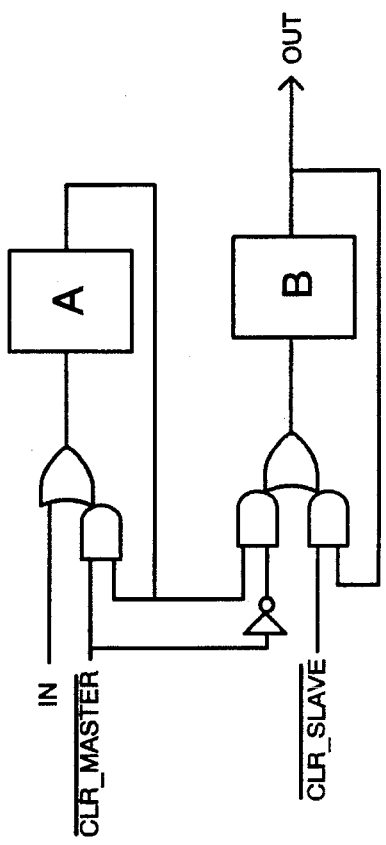
Figure 6:
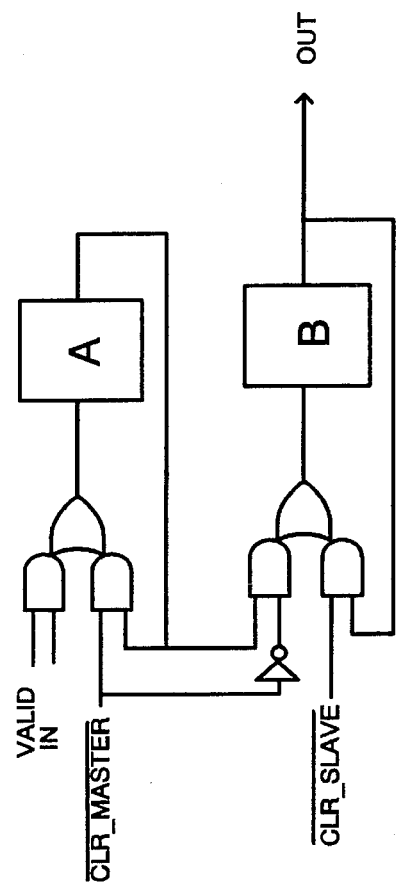

Referring now to FIGS. 5, 6 and 7, what are shown are more detailed implementations of CS latches 128 and 156, the bitrate latches 122 and 144 respectively and loopback/SQE latch 140 and 142.

The carrier sense is stored in the cs latch 128 and 156 respectively (FIG. 3 and 4 respectively). This is a single buffer latch. This latch is set when there is carrier sense activity and will stay set until the bit is scanned out. When this bit is being scanned out, the latch 128 and 156 is cleared during the same clock cycle unless carrier sense is still active. The circulating low bit in the strobe ring is used as a clear signal.

Data to the bitrate latches 122 and 144 and loopback/sqe latch 140 can also be stored in a similar way as the carrier sense (single buffer) with the exception that the clear signal must be gated to select the correct status latch to clear.

However, due to reasons unrelated to the minimum mode, bitrate, loopback, and sqe are double buffered. Whenever any of these events occur, the master latch shown in FIGS. 6 and 7 at A is set until cleared. Once every 10 bit times the contents in the master latch are transferred into the slave latch shown at B, and cleared. Once set the slave latch B remains set until it is cleared. Unlike the cs latch 128 and 156, the slave latch B is not cleared immediately after the bit is scanned out, but is cleared after the 10 bit cycle completes. Note that in this double buffering scheme no data is lost even though the slave latch is not immediately cleared after the bit is scanned out. All new activity is flagged in the master latch A while the content of the slave latch B is output and cleared.

The control circuit 17 generates CLRM to transfer and clear the master latch A for all the sticky status at the same time. CLRSB, CLRSL, and CLRSS clears the slave latch B containing bitrate, loopback, and sqe bits respectively.

Accordingly, a system is provided that monitors the status of ports of an IMR when the IMR is in minimum mode. This is accomplished through a circular shift register arrangement in which a circulating low bit is utilized to indicate that the status should be monitored. Thereafter, the data within the registers is scanned out on the serial out (SO) pin.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skill in the art without departing from the spirit and scope of present invention, the scope of which is defined solely by the appended claims.

We claim:

1. A system for monitoring the port activity of a multiport repeater when the repeater is in minimum mode, the repeater including a carrier sense (CRS) and a serial output (SO) pin, the monitor system comprising:

a circular shift register means for receiving a data stream wherein one of the bits in the data stream generates a pulse which indicates which port of the multiport repeater should output the status bits on the serial output pin; and means coupled to the register means for scanning the status output on the serial output (SO) pin when the pulse is generated.

2. The monitoring circuit of claim 1 in which the status signals comprise:

a link/loopback, a polarity/SQE, a partition, and a bitrate status.

3. A circuit for monitoring a plurality of ports of an Integrated Multiport Repeater, such that when the IMR is in minimum mode, the IMR receives carrier sense, signals for status information, serial output, signals for repeater management information, and a strobe, signal to provide signals that cause the IMR to read the CRS and SO signals from one of the plurality of ports, the monitor circuit comprising:

a plurality of serially coupled media attachment units, circuits, a first MAU circuit receiving an input data stream packet of information and a last MAU providing a data output stream packet of information;

an attachment unit interface, circuit serially coupled to the last one of the plurality of MAU circuits, the AUI circuit, upon detecting a particular bit in the data stream output, providing the strobe signal to the IMR; and means for causing the IMR to sense status signals from the SO signals in order to read from one of the plurality of ports in response to the STR signal provided by the AUI.

4. The monitor circuit of claim 3 in which the AUI circuit is coupled in a feedback circuit between the MAU circuits and the IMR in order to circulate a low bit indicating which port status of the plurality of ports is monitored.

5. The monitoring circuit of claim 4 in which each of the plurality of MAU circuits corresponds to a port of the plurality of ports of the IMR.

6. The monitoring circuit of claim 5 in which each of the MAU circuits includes a shift register for receiving the input data stream.

7. The monitoring circuit of claim 6 in which the AUI circuit includes a shift register for receiving the output data stream.

8. The monitoring circuit of claim 7 in which the shift registers of the MAU and AUI circuits are coupled as a shift register.

9. The monitoring circuit of claim 8 in which a low bit circulating in the circular shift register causes the STR signal to be output to the IMR.

10. The monitoring circuit of claim 3 in which the causing means comprises:

means for sampling a plurality of input signals; and means coupled to the sampling means for selecting a status bit to output from one of the plurality of ports.

11. The monitoring circuit of claim 10 in which the sampling means comprises a control circuit that samples a serial input signal SI, and a serial clock signal, SCLK.

12. The monitoring circuit of claim 11 in which the causing means further comprises means responsive to the selecting means for clearing the status bit.

\* \* \* \* \*